(12) United States Patent
Ayala

(10) Patent No.: US 9,810,022 B1
(45) Date of Patent: Nov. 7, 2017

(54) TOOL HOLDER SUPPORT

(71) Applicant: Lawrence Ayala, Surprise, AZ (US)

(72) Inventor: Lawrence Ayala, Surprise, AZ (US)

(*) Notice: Subject to any disclaimer, the term of this patent is extended or adjusted under 35 U.S.C. 154(b) by 0 days.

(21) Appl. No.: 15/169,677

(22) Filed: May 31, 2016

Related U.S. Application Data

(63) Continuation-in-part of application No. 14/512,424, filed on Oct. 11, 2014.

(60) Provisional application No. 62/169,431, filed on Jun. 1, 2015, provisional application No. 62/169,450, filed on Jun. 1, 2015.

(51) Int. Cl.
*E06C 7/16* (2006.01)
*E06C 7/14* (2006.01)
*F16M 13/02* (2006.01)
*F16B 2/06* (2006.01)

(52) U.S. Cl.
CPC .......... *E06C 7/14* (2013.01); *E06C 7/143* (2013.01); *E06C 7/16* (2013.01); *F16B 2/065* (2013.01); *F16M 13/022* (2013.01)

(58) Field of Classification Search
CPC . E06C 7/14; E06C 7/143; E06C 7/165; E06C 7/146; E06C 7/16; F16B 2/065; F16M 13/022; B44D 3/14
USPC .................................. 248/77, 210, 211, 238
See application file for complete search history.

(56) References Cited

U.S. PATENT DOCUMENTS

| | | | | |
|---|---|---|---|---|
| 3,353,778 A | * | 11/1967 | Sylvain | E06C 7/14 248/211 |
| 3,822,846 A | * | 7/1974 | Jesionowski | B05C 21/00 15/257.06 |
| 4,025,016 A | * | 5/1977 | Brothers | E06C 7/14 248/210 |
| 4,367,857 A | * | 1/1983 | McCarthy | F16L 3/00 248/74.1 |
| 4,569,449 A | * | 2/1986 | Brent | E06C 7/14 182/129 |
| 4,580,660 A | * | 4/1986 | Oling | E06C 7/48 182/107 |
| 4,660,794 A | * | 4/1987 | Given | E06C 7/188 182/120 |
| 5,035,299 A | | 7/1991 | Eisenberg | |
| 5,052,581 A | * | 10/1991 | Christ | E06C 7/14 15/257.06 |

(Continued)

FOREIGN PATENT DOCUMENTS

| | | |
|---|---|---|
| CN | 202360017 U | 8/2012 |
| CN | 202866298 U | 4/2013 |

OTHER PUBLICATIONS

Self Leveling Paint Can Holder Extension Ladder Brush, http://www.vendio.com/stores/JKDistributing/item/ladder-caddy-painting-products/self-leveling-paint-can-holder/lid=22255427.

(Continued)

*Primary Examiner* — Nkeisha Smith
(74) *Attorney, Agent, or Firm* — Inspired Idea Solutions Law Firm; Wayne Carroll

(57) ABSTRACT

A tool holder support structure is disclosed that may include a longitudinal support portion extending between a first end and a second end; a first brace connected to the first end, and a second brace slidably connected to the longitudinal support portion. The tool holder may include at least one threaded rod with at least one clamp surface, and a tool holder base connected to the longitudinal support portion, the tool holder base may include a tool holder opening for receiving a tool holder.

12 Claims, 7 Drawing Sheets

(56) References Cited

U.S. PATENT DOCUMENTS

| | | | |
|---|---|---|---|
| 5,135,193 A | 8/1992 | Parris | |
| 5,275,256 A * | 1/1994 | Ellzey | E06C 7/14 |
| | | | 104/246 |
| 5,293,957 A | 3/1994 | Lunden, Jr. | |
| 5,316,251 A | 5/1994 | McGraw | |
| 5,845,742 A * | 12/1998 | Tade | E06C 7/146 |
| | | | 182/129 |
| 5,934,632 A | 8/1999 | Weaver | |
| 6,076,636 A | 6/2000 | Tietge | |
| 6,131,866 A | 10/2000 | Kesinger | |
| 6,766,990 B1 | 7/2004 | Hileman et al. | |
| 6,848,540 B2 * | 2/2005 | Kvam | E06C 7/14 |
| | | | 182/121 |
| 7,059,448 B2 | 6/2006 | Beechler | |
| 7,309,088 B2 | 12/2007 | Fiore et al. | |
| 7,905,458 B2 | 3/2011 | Hohensee | |
| 7,926,616 B2 * | 4/2011 | Groy | E06C 7/14 |
| | | | 182/129 |
| 8,033,362 B1 | 10/2011 | Cull | |
| 8,162,275 B2 | 4/2012 | Reusser | |
| 8,944,213 B2 * | 2/2015 | Astor | E06C 1/39 |
| | | | 182/129 |
| 9,163,783 B1 * | 10/2015 | McLaughlin | F16M 13/022 |
| 9,199,119 B2 * | 12/2015 | Hetrick | A63B 23/0216 |
| 2003/0160140 A1 * | 8/2003 | Nastase | E06C 7/14 |
| | | | 248/210 |
| 2008/0061201 A1 * | 3/2008 | Sasser | E06C 7/14 |
| | | | 248/210 |
| 2008/0251316 A1 * | 10/2008 | Libert | E04G 5/10 |
| | | | 182/115 |
| 2013/0140423 A1 | 6/2013 | Taylor | |
| 2013/0192924 A1 | 8/2013 | Paun | |
| 2013/0256481 A1 * | 10/2013 | Saucier | E06C 7/143 |
| | | | 248/210 |
| 2014/0014797 A1 * | 1/2014 | McSherry | F16B 2/12 |
| | | | 248/231.41 |
| 2014/0197292 A1 * | 7/2014 | Figueroa | F16M 13/022 |
| | | | 248/227.1 |
| 2015/0225969 A1 * | 8/2015 | O'Grady, Sr. | E04G 3/265 |
| | | | 182/45 |
| 2015/0362093 A1 * | 12/2015 | Henderson | F16M 13/022 |
| | | | 248/55 |

OTHER PUBLICATIONS

Extension Ladder Bucket Holder, http://www.todayshomeowner.com/video/extension-ladder-bucket-holder/.

The Hangman: an invention to secure tools to your ladder by Kayenta Saucier—Kickstarter, https://www.kickstarter.com/projects/thehangman/the-hangman-an-invention-to-secure-tools-to-your-l.

* cited by examiner

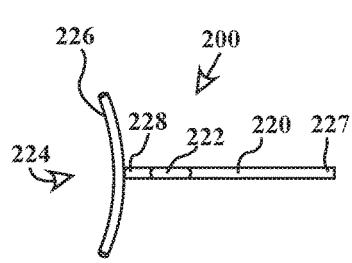
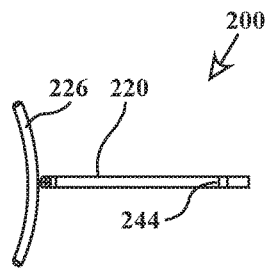
FIG. 11  FIG. 12
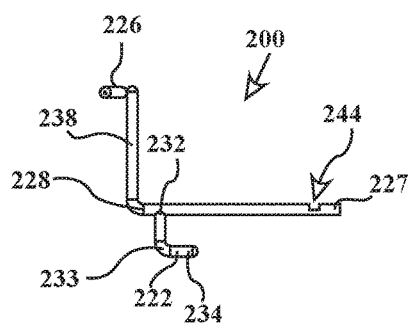
FIG. 13
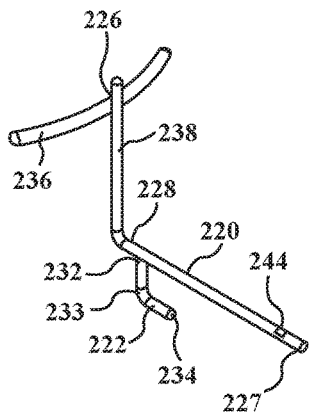
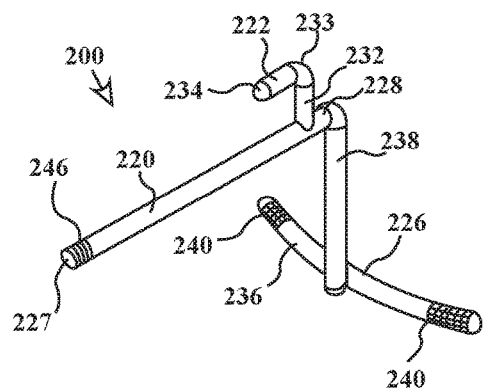
FIG. 14  FIG. 15

TOOL HOLDER SUPPORT

RELATED APPLICATIONS

This application is related to non-provisional U.S. patent application Ser. No. 14/512,424 filed on 11 Oct. 2014, and claims international date priority thereof as a Continuation-In-Part application, and its subject matter is hereby incorporated herein by reference in its entirety. This application is related to provisional application 62/169,431 filed on 1 Jun. 2015 and claims international date priority thereof, and its subject matter is hereby incorporated herein by reference in its entirety. This application is related to provisional application 62/169,450 filed on 1 Jun. 2015 and claims international date priority thereof, and its subject matter is hereby incorporated herein by reference in its entirety.

BACKGROUND

1. Technical Field

This disclosure relates to devices for holding tools and buckets and more specifically devices designed to be supported by a ladder.

2. Background

Workers who use extension ladders or step ladders (such as A-frame ladders) often have multiple pieces of equipment or tools that they need to use when they are on a ladder. For example, a painter may use a paint sprayer with a hose line, and have a paint roller that is used in conjunction. Other workers use equipment with electrical cords such as a drill, and have other tools that are needed at the same time. Painters or workers also use buckets, such as paint buckets with paint, to paint edges and corners where sprayers or rollers cannot properly reach.

Workers will often bring multiple tools and a bucket of paint up on a ladder, and store some of the tools on the rungs or steps of the ladder until needed, and rest the can or bucket of paint on a rung or a step. For example, a painter will bring a paint sprayer and a roller up on a ladder, and place the roller resting against a ladder rung or step while spraying, and then will place the paint sprayer resting on a ladder rung or step while using the roller to further spread the paint. The painter may then need to climb down the ladder with the paint sprayer and climb back up the ladder with a bucket of paint for the areas where the sprayer and roller did not reach. Further, while painting with the paint in the bucket, the painter may need to balance the paint can on the ladder to maintain three-point contact with the ladder while holding the paint brush and painting.

The past methods present a hazard as a cord or hose can trip the worker when it hangs onto the ladder rungs or steps, and the paint can or bucket can fall or distract the worker on the ladder while trying to balance the paint can and paint. When a tool with a cord or hose is stored on one of the ladder rungs or steps, the cord or hose will hang down along the rungs or steps of the ladder where the worker is standing. The hose or cord can interfere with the feet of the worker and cause a hazardous situation. The tool can also be damaged if the worker steps on the hose or cord, or accidently causes the equipment to fall.

Tools and buckets that do not have a cord or hose can also be hazardous when used on an extension ladder or step ladder, because the worker needs to hold the tool or bucket, or balance the tool on the ladder so that it will not fall when it is being used. If the tool is dropped the tool can break, or someone working near the ladder can become injured.

BRIEF DESCRIPTION OF THE DRAWINGS

FIG. 11 is a top view of an embodiment of a tool holder.

FIG. 12 is a bottom view of an embodiment of a tool holder.

FIG. 13 is a side view of an embodiment of a tool holder.

FIG. 14 is a bottom perspective view of an embodiment of a tool holder.

FIG. 15 is a top perspective view of an embodiment of a tool holder.

DETAILED DESCRIPTION

Figure 1:
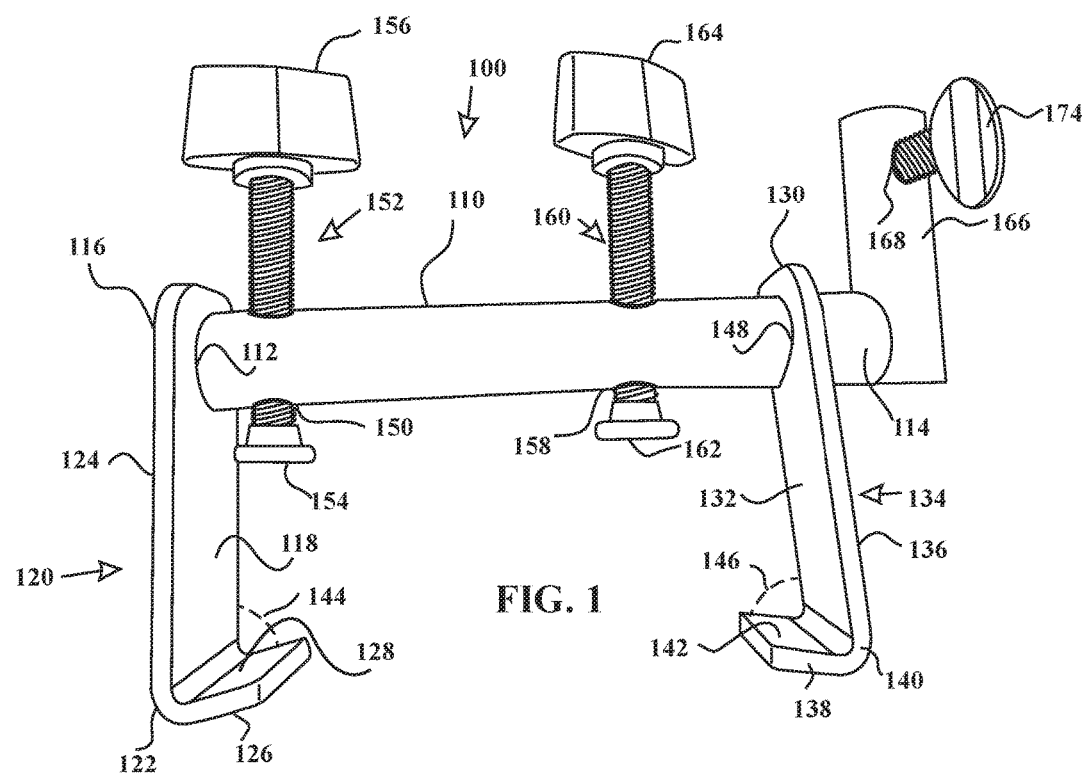
FIG. 1 is a top perspective view of an embodiment of a tool holder support.
Figures 2, 3:
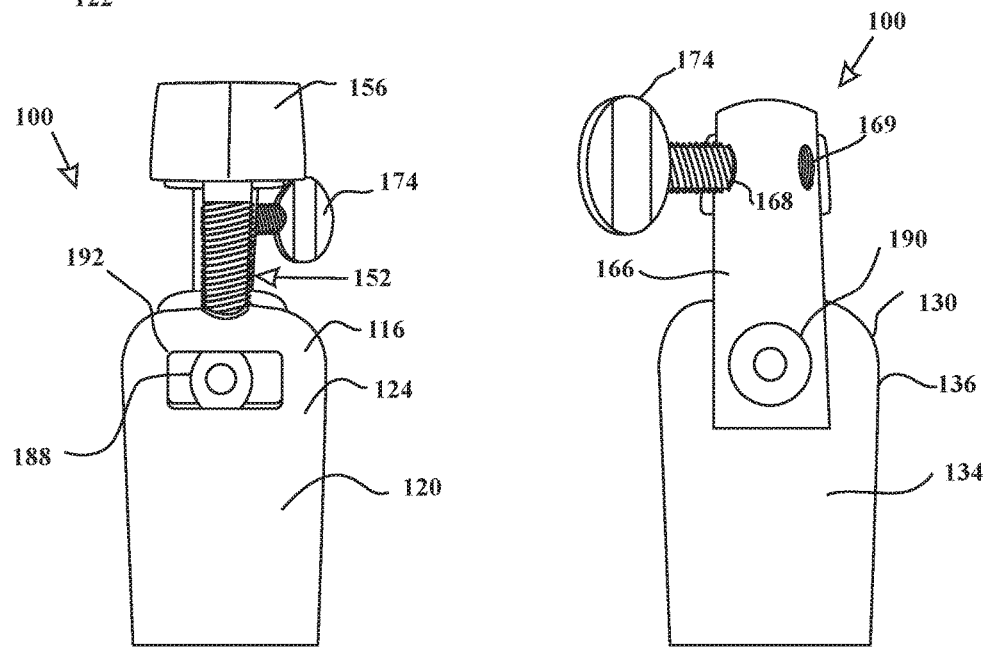
FIG. 2 is a first side view of an embodiment of a tool holder support.
FIG. 3 is a second side view an embodiment of a tool holder support.
Figure 4:
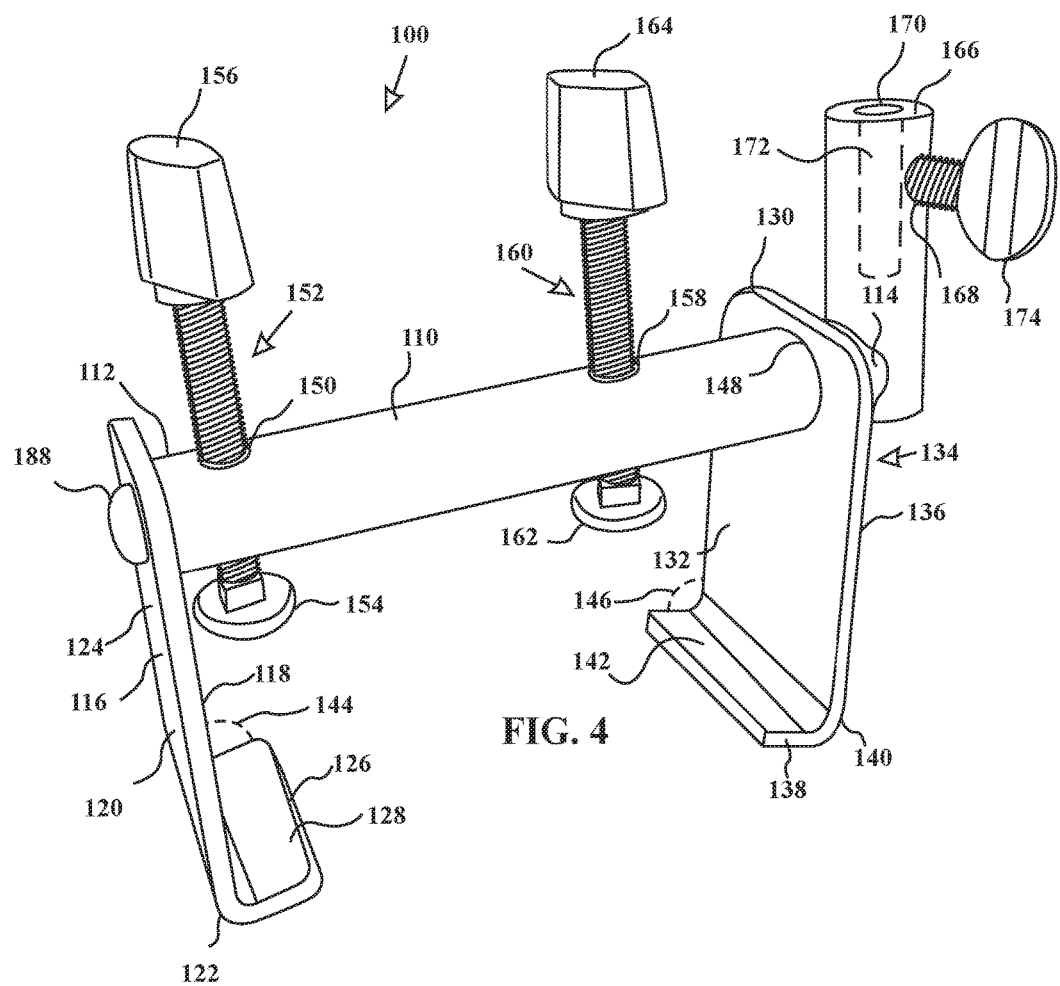
FIG. 4 is a top perspective view of an embodiment of a tool holder support.
Figure 5:
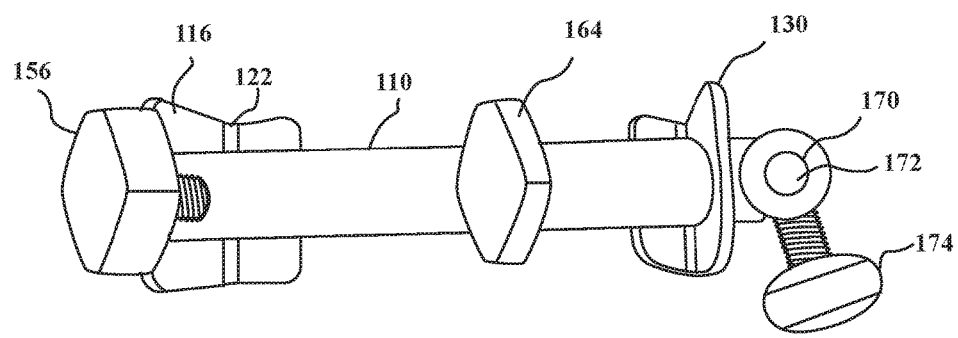
FIG. 5 is a front view of an embodiment of a tool holder support.
Figure 6:
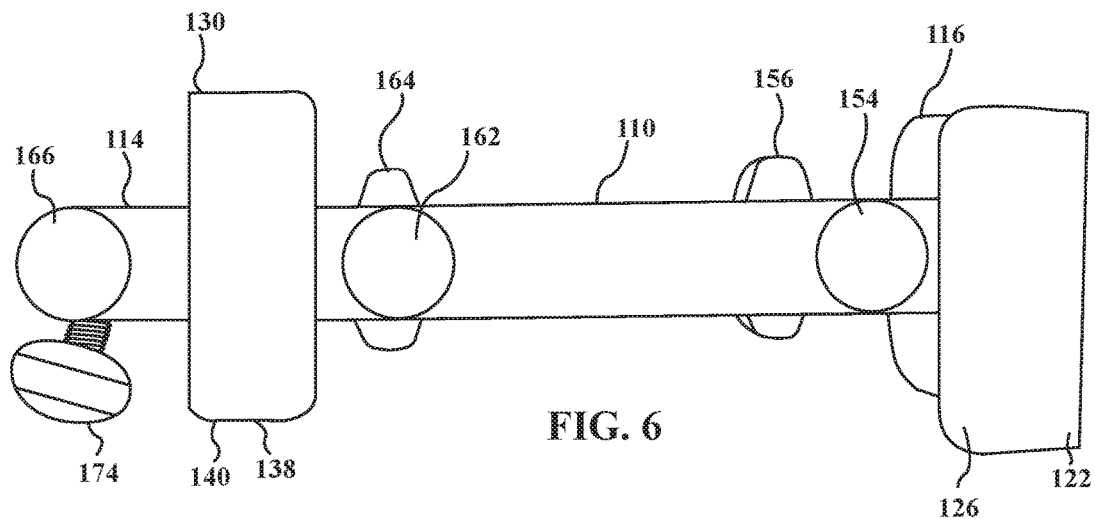
FIG. 6 is a rear view of an embodiment of a tool holder support.

An example embodiment of a device 100 is shown in FIGS. 1-6. The device 100 may be used to support interchangeable tool holders, such as a bucket holder, a paint sprayer holder, and other tool holders including tool holders described in prior applications that are incorporated by reference. In this document "tool" is used in the broad sense of the word, so that a bucket is a tool, and other items that a person may use on a ladder, including paint brushes or other items, are considered tools, even if they are not within the traditional sense of the word tool. In some embodiments a device 100 may include a longitudinal support portion 110 extending between a first end 112 and a second end 114. A first brace 116 may be connected to the first end 112 of the longitudinal support portion 110. The first brace 116 may include a first inside surface 118, a first outside surface 120, a first side extension 124 and a first clamp extension 126. The first brace 116 may also include a first elbow 122 between the first side extension 124 and the first clamp extension 126. A first elbow angle 144 may be along the first inside surface 118, and may be approximately 90 degrees or less. The first inside surface 118 along the first clamp extension 126 may have a first brace clamp surface 128. The first brace 116 may be perpendicularly connected to the longitudinal support portion 110. In some embodiments the first brace 116 includes a non-rotational connection 192. The first brace 116 may connect to the longitudinal support portion 110 using a first fastener 188. The first end 112 of the longitudinal support portion 110 may have a feature with edges that align with one or more features on the first brace 116 so that when the first fastener 188 is tightened the features may prevent rotation of the first brace 116 relative to the longitudinal support portion 110. The non-rotation of the first brace 116 may assist a user to install the device 100 on a ladder, as the non-rotational connection 192 may allow the user to easily position the device on a ladder.

The first inside surface 118 along the first side extension 124 may be facing the second end 114 of the longitudinal support portion 110.

The device 100 may also include a second brace 130 slidably engaged with the longitudinal support portion 110. The second brace 130 may include a second inside surface 132, a second outside surface 134, a second side extension 136 and a second clamp extension 138. A second elbow 140 may be between the second side extension 136 and the second clamp extension 138. A second elbow angle 146 may be along the second inside surface 132 and may be approximately 90 degrees or less. The second inside surface 132 along the second clamp extension 138 may have a second brace clamp surface 142. The second inside surface 132 along the second side extension 136 may be facing the first end 112 of the longitudinal support portion 110. The second inside surface 132 may be facing the first inside surface 118.

Figure 7:
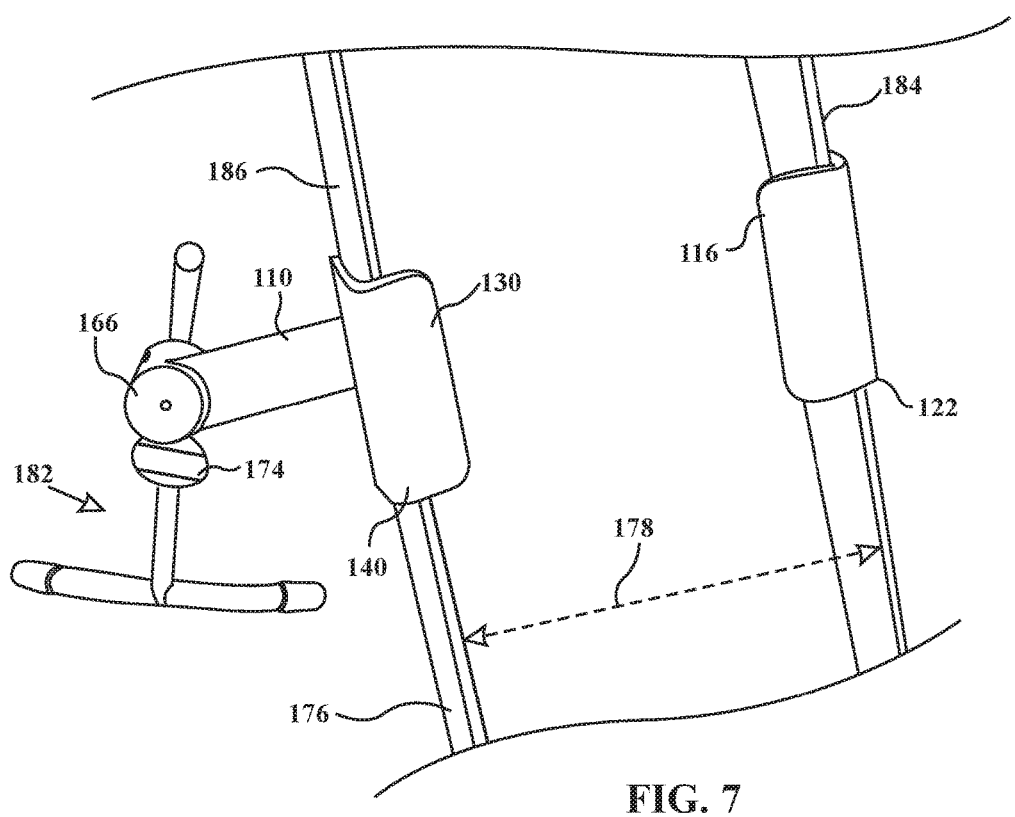
FIG. 7 is a rear view of an embodiment of a tool holder support on a step ladder support.
Figure 8:
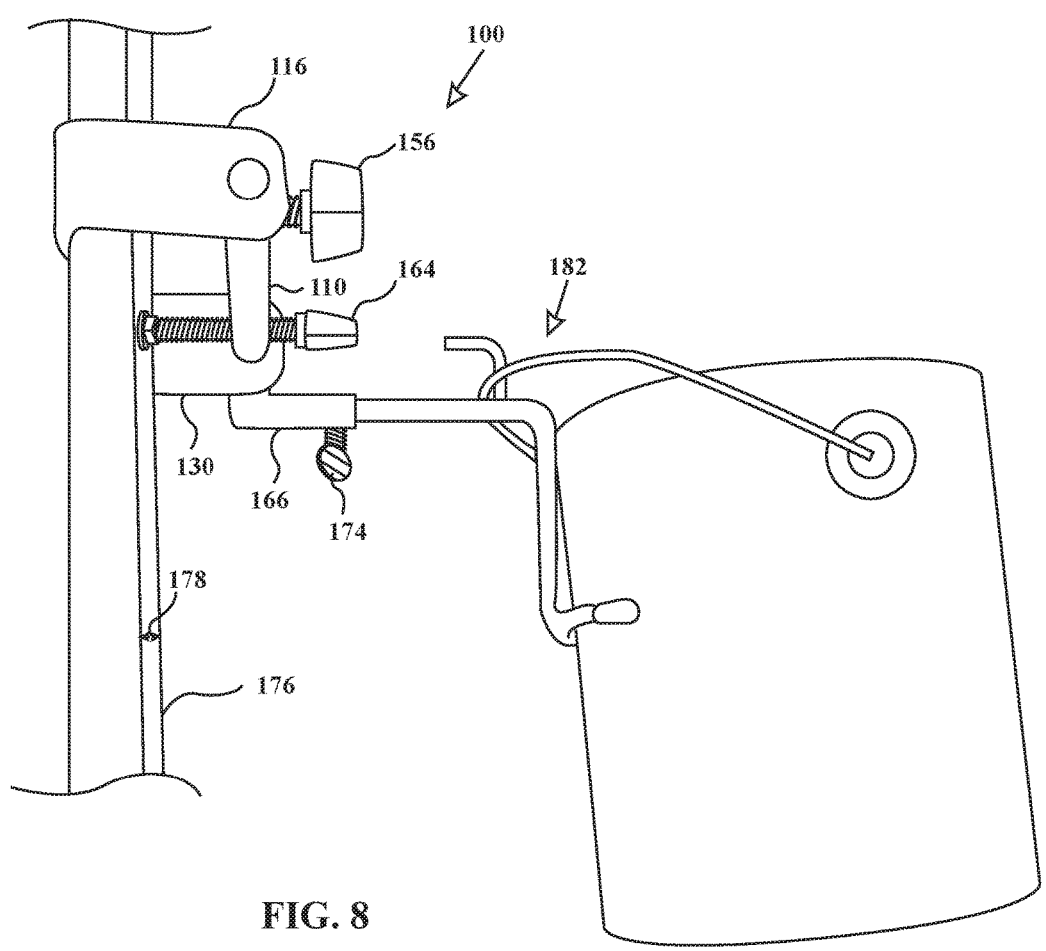
FIG. 8 is a side perspective view of an embodiment of a tool holder support on a step ladder with a tool holder and a paint bucket.
Figure 9:
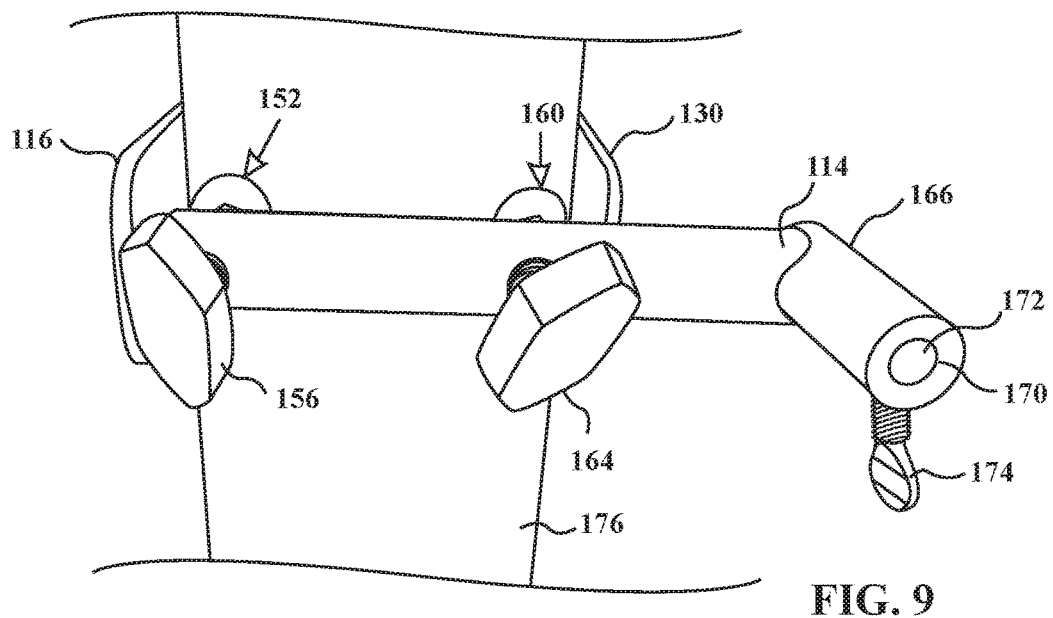
FIG. 9 is a front view of a ladder and an embodiment of a tool holder support on a step ladder support.
Figure 10:
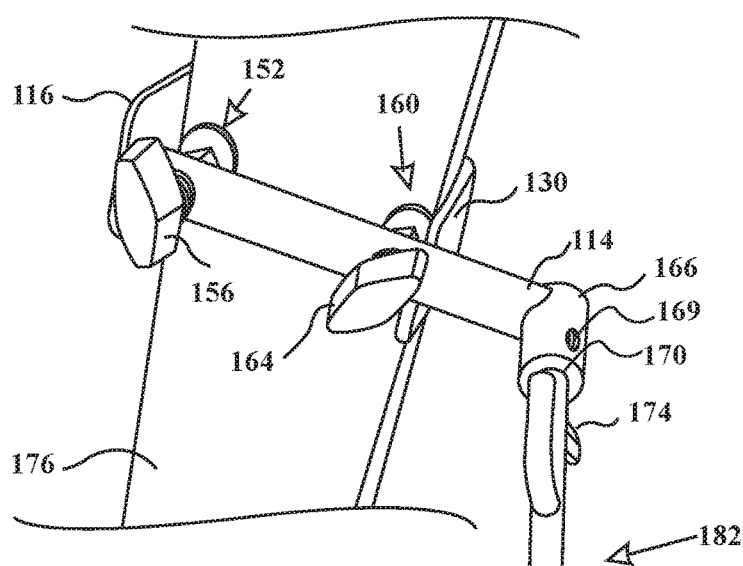
FIG. 10 is a front view of a ladder and an embodiment of a tool holder support on a step ladder support with a bucket holder tool.

The longitudinal support portion 110 may also include a first threaded rod 152 passing through a first threaded channel 150 in the longitudinal support portion 110. The first threaded rod 152 may include a first clamp surface 154 and a first hand-adjuster 156. A tool holder base 166 may be connected to the longitudinal support portion 110. The tool holder base 166 may include a tool holder opening 170 (shown in FIGS. 4 and 5) for receiving a tool holder 182 (an example is shown in FIGS. 7, 8, and 10.). The tool holder base 166 may be connected to the second end 114 of the longitudinal support portion 110 with a fastener 190. The tool holder base 166 may be fixed rotationally relative to the longitudinal support portion 110. The tool holder base 166 may be perpendicular to the longitudinal support portion 110, and may extend in an opposite direction from the first brace 116. The angle of the tool holder base 166, which is relative to the ladder support, and therefore relative to the ground when the ladder is placed on level ground, may establish the angle of the tool holder 182. Some tool holders may work best when they are substantially level to the ground, or do not deviate from level by more than an acceptable angle, therefore the angle of the tool holder base 166 may be coordinated with the shape and angle of the tool holder 182. The angle of the tool holder base 166 may be angles other than perpendicular to the longitudinal support portion 110.

The longitudinal support portion 110 may also include a second threaded rod 160 passing through a second threaded channel 158 in the longitudinal support portion 110. The second threaded rod 160 may include a second clamp surface 162 and a second hand-adjuster 164. The first clamp surface 154 may be configured to face the first brace clamp surface 128. The first hand-adjuster 156 may be configured to rotate the first threaded rod 152 and advance the first threaded rod 152 towards the first brace clamp surface 128. The second clamp surface 162 may be configured to generally face the second brace clamp surface 142.

The tool holder opening 170 may include a longitudinal channel 172 inside the tool holder base 166. The tool holder base 166 may include a first threaded opening 168 through a side of the tool holder base 166, and the first threaded opening 168 may open into the longitudinal channel 172. The tool holder base 166 may include a threaded tightening rod 174 configured to enter the first threaded opening 168 and pass into the longitudinal channel 172. In some embodiments the tool holder base 166 may include a second threaded opening 169 (shown in FIG. 3). The first threaded opening 168 and the second threaded opening 169 may be configured at a location to align with a notch 244 on a tool holder 182 so that by tightening the threaded tightening rod 174 against a tool holder 182 when it is inside the longitudinal channel 172, the tool holder 182 may be prevented from rotating relative to the tool holder base 166. The first threaded opening 168 and the second threaded opening 169 may be positioned to so that the device 100 may be used on the right side or the left side of a ladder.

A ladder support 176 is shown in FIG. 7. Ladder supports are generally at an angle relative to the ground when in use. The device 100 may align with the first edge 184 of the ladder support 176 and the second edge 186 of the ladder support 176, so that the longitudinal support portion 110 is held approximately perpendicular to the angle of the ladder support 176. The first threaded opening 168 may be at an angle to the longitudinal support portion 110 so that it aligns with a notch 244 (shown in FIGS. 13 and 14) and holds the tool holder 182 close to level with the ground, or at least in a stable rotational position relative to the ladder support 176. The second threaded opening 169 may be at a different angle so that the user can change the device to be used on either the right side or the left side of the ladder.

A first clamping structure may include the first brace 116 with the longitudinal support portion 110 and the first threaded rod 152. The first clamping structure may clamp onto the first edge 184 of the ladder support 176. A second clamping structure may include the second brace 130 with the longitudinal support portion 110 and the second threaded rod 160. The second clamping structure may clamp onto the second edge 186 of the ladder support 176. In some embodiments the device 100 may have only one threaded rod positioned between the first brace 116 and the second brace 130. The second brace 130 may be able to slide along the longitudinal support portion. In some embodiments the second brace 130 includes a second brace opening 148 that allows the second brace 130 to slide along the longitudinal support portion 110. The longitudinal support portion 110 is shown in the example embodiments as a round rod, but may be other shapes in other embodiments, and the second brace opening 148 may have a shape that corresponds to the shape of the longitudinal support portion 110. Other methods may be used to allow the second brace 130 to slide along the longitudinal support portion 110.

In some embodiments the first brace 116 may be attached to the first end 112 of the longitudinal support portion 110 in a fixed manner. For example, the first brace 116 may be attached with a bolt secured in a threaded portion of the longitudinal support portion 110. In another example the first brace 116 is welded to the longitudinal support portion 110, and in other embodiments the first brace 116 may be connected with adhesives, or formed as one piece with the longitudinal support portion 110. The first brace 116 may be fixed in relation to the longitudinal support portion 110 so that the first brace 116 does not rotate about the longitudinal support portion 110. In some embodiments with the first brace 116 fixed in relation to the longitudinal support portion 110, a stable clamp structure may be formed including the first threaded rod 152.

In some embodiments the second brace 130 may be separated from the device 100. The second brace 130 may be formed with a second brace opening 148 that may allow the longitudinal support portion 110 to fit through the second brace opening 148. In some embodiments the second brace opening 148 also fits over the tool holder base 166, so that the device 100 may be assembled by sliding the second brace opening 148 over the tool holder base 166 and past the second end 114 of the longitudinal support portion 110. In some embodiments the second brace 130 may be slidably connected to the longitudinal support portion 110 to allow for the device 100 to be attached to different ladders having variation in the width 178 of the ladder support 176. The second brace 130 may slide to allow the device to clamp around the second edge 186 of the ladder support 176.

A user may place the first brace 116 against the first edge 184 of the ladder support 176, and slide the second brace 130 away from the second threaded rod 160 to allow the second brace 130 with the second clamp extension 138 to go around the second edge 186 of the ladder support 176. The user may then slide the second brace 130 towards the second threaded rod 160 and against the second edge 186 of the ladder support 176. The user may then use the first hand-adjuster 156 and the second hand-adjuster 164 to move the first threaded rod 152 and the second threaded rod 160 against the ladder support 176, clamping the device 100 to the ladder support 176. The user may insert a tool holder 182 into the longitudinal channel 172 and align a notch 244 on the tool holder 182 with the threaded tightening rod 174. The user may turn the threaded tightening rod 174 to fix the rotational position of the tool holder 182 relative to the tool holder base 166. The user may then attach a tool to the tool holder 182 and have a safe place to store a tool while on a ladder.

In some embodiments the device 100 may have only one threaded rod such as the first threaded rod 152. The first clamp surface 154 may be any size that would fit between the first inside surface 118 and second inside surface 132. In some embodiments the first clamp surface 154 may have a portion that is directly opposite the first brace clamp surface 128, which may provide a better clamping function on one edge of a ladder support than if at least a portion of the first clamp surface was not directly opposite a portion of the first brace clamp surface 128.

The device 100 may be attached to a ladder support 176 as shown in FIGS. 7-10. The first brace 116 may be placed around a first edge 184 of the ladder support 176 and the second brace 130 may be adjusted to be around the second edge 186 of the ladder support 176, which may be opposite the first edge 184. The ladder support 176 may have a width 178. The distance between the first brace 116 and the second brace 130 may be adjusted so that it is approximately equal to the width 178 of the ladder support 176.

The first clamp extension 126 and the second clamp extension 138 may extend towards each other to securely hold the device 100 to the ladder support 176 when at least the first threaded rod 152 is tightened. The second threaded rod 160 may also be tightened against the ladder support 176. A tool holder 182, such as the bucket holder shown in the example drawings, may be supported by the device 100 by inserting a portion of the tool holder 182 into the tool holder opening 170 and into the longitudinal channel 172. The threaded tightening rod 174 may be tightened against the portion of the tool holder 182 in the longitudinal channel 172 thereby securing the tool holder 182 in place.

In some embodiments the tool holder 182 may have a notch 244 in the portion to be inserted into the longitudinal channel 172, and the threaded tightening rod 174 may be inserted into the notch portion of the tool holder 182, thereby limiting the ability of the tool holder 182 to rotate relative to the tool holder base 166.

FIGS. 7-10 show example embodiments where the tool holder base 166 may be attached to a ladder and may be supported by a ladder support 176. The ladder may be an A-frame ladder, or an extension ladder, or other type of ladder. The tool holder base 166 may be supported by the ladder support 176.

An example embodiment of a tool holder may be a bucket holder 200 as is shown in FIGS. 11-17. The bucket holder 200 may be used to hold a paint bucket 210, such as a one-gallon paint bucket. In some embodiments a first portion 220 may extend between a near end 227 and a far end 228. A handle retainer 222 may extend from the first portion 220 in a first direction. A bucket stabilizer 224 may extend from the first portion 220 in a second direction. The second direction may be substantially opposite the first direction. The bucket stabilizer 224 may have a concave portion 226 configured to contact a bucket in two or more places.

In some embodiments the handle retainer 222 may extend substantially perpendicular to the first portion 220. The handle retainer 222, may have a bend 233 and may have a first end 232 and a second end 234. The first end 232 may extend from the first portion 220. The second end 234 may be parallel with the first portion 220 and may extend towards the near end 227 of the first portion 220. In some embodiments the handle retainer 222 may not have a bend, and may extend perpendicular to the first portion 220, or may extend at an angle so that the second end 234 is closer to the near end 227 of the first portion 220 than the first end 232 of the handle retainer 222. The bend 233 in the handle retainer 222 may be an angle between two perpendicular parts, and it may also be a curve that is continuous over a portion or all of the handle retainer 222.

The bucket stabilizer 224 may include a support arm 238 and a stabilizer arm 236. In some embodiments the concave portion 226 may be the stabilizer arm 236. The concave portion 226 may extend in a direction substantially perpendicular to the support arm 238. The concave portion 226 may be attached to the support arm 238. The concave portion 226 may have at least one end that is further from the support arm 238 than the place where the concave portion 226 is connected to the support arm 238. The support arm 238 may extend from the far end 228 of the first portion 220.

The stabilizer arm 236 may have a grip layer 240 on at least a portion of the stabilizer arm 236.

Figure 16:
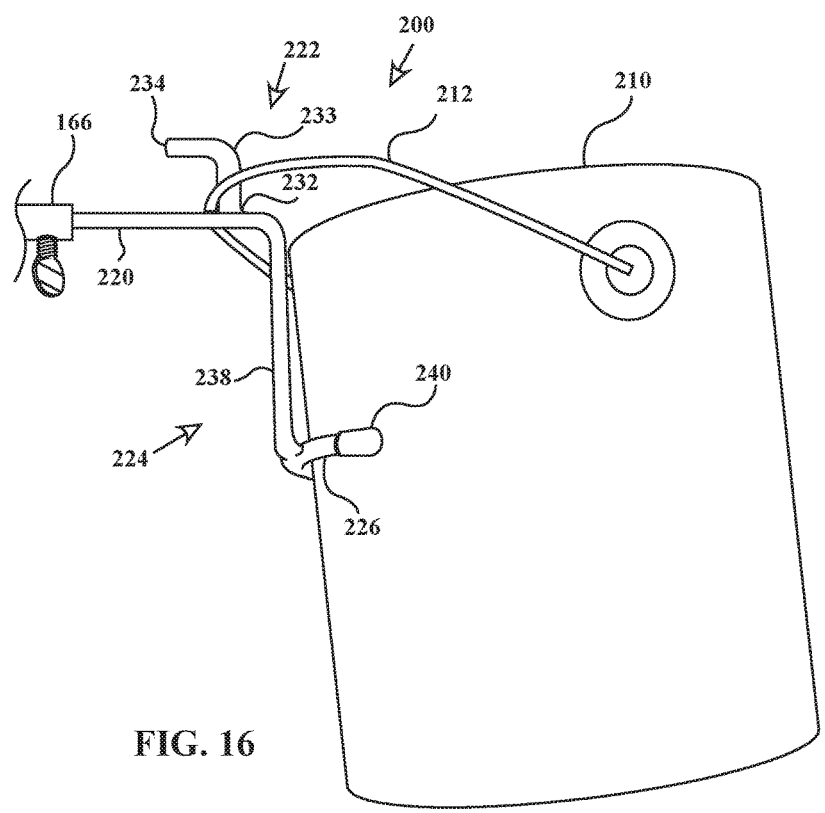
FIG. 16 is a side view of an embodiment of a tool holder with a bucket.

The near end 227 of the first portion 220 may have an attachment structure configured for attaching the first portion 220 to a base 350 (shown in an example embodiment in FIG. 16). The attachment structure may be a notch 244 as illustrated in the example embodiment of FIGS. 9, 10 and 11. The attachment structure may be a threaded end 246 as illustrated in the example embodiment of FIG. 15.

In some embodiments the first portion 220 and the support arm 238 may be formed by bending a metal rod at an angle. The handle retainer 222 may be welded to the first portion 220 at a position set back from the far end 228 of the first portion 220.

FIG. 16 shows an example embodiment of a bucket holder 200 in use with a bucket 210, having a bucket handle 212. The handle retainer 222 may be configured to retain the bucket handle 212 attached to the bucket 210 at an angle so that the bucket handle 212 may not be above the top of the bucket 210. The bucket stabilizer 224 may be configured to contact the bucket 210 in two places so that the bucket handle 212 may be restrained by the handle retainer 222, and the bucket 210 may rest in a stable position relative to the bucket holder 200.

In some embodiments the base may be attached to a ladder and may be supported by a ladder. The ladder may be an A-frame ladder, or it may be an extension ladder. The base may be supported by the ladder or other device in various ways.

Figure 17:
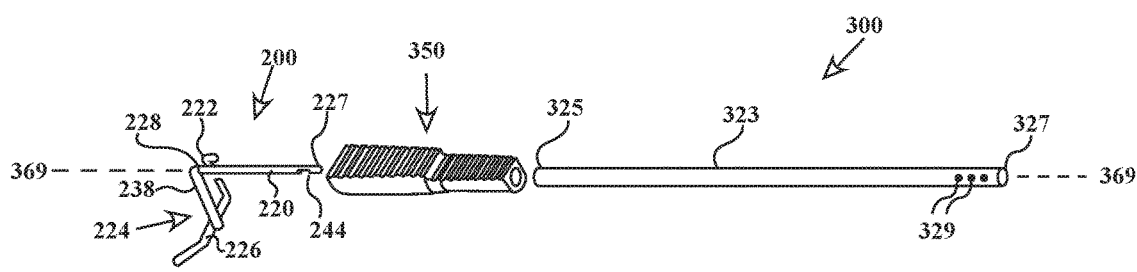
FIG. 17 is a side exploded perspective view of an embodiment of a ladder assist tool.

An example embodiment of a ladder assist tool 300 is shown in FIG. 17. The ladder assist tool 300 is an embodiment of a tool with base 350 designed to fit inside the rung of a hollow rung ladder. At one end of the base 350 a bucket holder 200 may be connected to the base 350. The base may have a longitudinal axis 369, and the bucket holder 200 may be connected to the base 350 along the longitudinal axis 369. At the other end of the base 350 a base extension 323 may be connected along the longitudinal axis 369. The base extension 323 may have a first end 325 connected to the base 350, and the base extension 323 may have a second end 327. The second end 327 may have holes 329 to allow a pin or other device to be inserted across the base extension 323.

In the illustrated example the ladder assist tool 300 may be placed into the rung of a ladder such as an extension ladder or an a-frame ladder with open rungs. The base 350 may fit tightly into the hollow rung, and the base extension 323 may extend into the hollow ladder rung and out the other side of the ladder. The second end 327 of the base extension 323 may come out the other side of the ladder. The holes 329 may be exposed after the ladder assist tool 300 is fully inserted into the rung of the ladder, and a pin such as a cotter pin, may then be inserted into one of the holes 329 to retain the ladder assist tool 300 in place.

In some embodiments the base extension 323 may be a round metal rod or steel pipe. In other embodiments the base extension 323 may be made from other metal material, or from non-metallic materials. The base extension 323 is shown in the illustrated embodiment as round. In other embodiments the base extension 323 may be other shapes including square, triangular, hexagonal, or other shapes.

The bucket holder 200 may support a bucket or pail or tray with a handle or can of paint and allow a worker to safely navigate a ladder or use other tools without holding or balancing a paint can or other device.

The bucket holder 200 may be attached to the base 350 in many different ways. In some embodiments the bucket holder 200 may be attached to the base 350 with a threaded end 246 that may be used to secure the bucket holder to a threaded piece in the base 350 or a threaded piece in the base extension 323. A locking nut may be used to secure the threaded end 246 and the bucket holder 200 in a preferred rotational position. In some embodiments a notch 244 may be positioned and configured to allow a threaded rod with a flat end that may be passed through a threaded portion in the base 350 to contact a flat portion in the notch 244 and thereby prevent rotation of the bucket holder 200 relative to the base 350. In other embodiments the base 350 may be secured to the base extension 323 by welding, and the base 350 may be formed or assembled around the base extension 323. Other embodiments may use adhesives, or structures to secure the bucket holder 200. The base 350 may be configured to allow multiple attachments so that one type of support structure or tool holder may be replaced by a different type of tool holder based on the needs of the user.

In some embodiments the bucket holder 200 tool may be inserted into a ladder where the top of the ladder rungs are generally horizontal. The preferred position of the bucket holder 200 may also be generally horizontal. The base 350 in this embodiment may have one or more generally flat top portions that aligns the ladder assist tool 300 to the top of a ladder rung and may prevent the ladder assist tool 300 from rotating. In some embodiments the ladder assist tool 300 may be generally flat and within a horizontal plane, which may be aligned to be substantially parallel to the top of the ladder rung.

The above embodiments are illustrated and discussed as examples. Variations may be made in the shape, materials, function and operation of the above embodiments and remain within the invention as claimed. The terms "right" and "left" are used for the purpose of illustration and not in a restrictive manner. The first brace 116, for example, may be on a user's left or right, and does not indicate any orientation to a person or thing. For example, the base 350 is shown with a flat side on top. In other embodiments the base structure may be round without a flat side and may fit into the hollow rung of a ladder.

While the principles of the invention have been made clear in illustrative embodiments, there will be immediately obvious to those skilled in the art many modifications of structure, arrangement, proportions, and methods, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claimed is:

1. A device comprising:
    a first clamping structure with a first threaded rod;
    a second clamping structure connected to the first clamping structure, with a second threaded rod that is substantially parallel to the first threaded rod;
    a tool holder base connected to the first clamping structure and the second clamping structure, wherein the tool holder base includes a longitudinal channel for receiving a tool holder;
    wherein the first clamping structure includes a longitudinal support portion with a first threaded channel, and the first threaded rod in the first threaded channel;
    wherein the first clamping structure includes a first brace with a non-rotational connection to a first end of the longitudinal support portion; and
    wherein the first brace extends from the longitudinal support portion in a first direction, and the tool holder base extends from the longitudinal support portion in a second direction opposite to the first direction.

2. The device of claim 1 wherein the first threaded rod includes a first clamp surface, and wherein the first brace includes a first brace clamp surface, and wherein the first clamp surface is advanced towards the first brace clamp surface when the first threaded rod is turned relative to the longitudinal support portion.

3. The device of claim 1 wherein the second clamping structure includes a second threaded channel in the longitudinal support portion, and the second threaded rod in the second threaded channel.

4. The device of claim 3 further comprising a second brace connected to the longitudinal support portion, wherein the second threaded rod is between the first threaded rod and the second brace.

5. The device of claim 3 wherein the longitudinal support portion includes a second end, wherein a second brace is slidably supported by the longitudinal support portion between the second threaded rod and the second end.

6. The device of claim 1 wherein the tool holder base includes a first threaded opening, and a threaded tightening rod that extends through the first threaded opening into the longitudinal channel.

7. The device of claim 1 wherein the first brace includes a first side extension and a first clamp extension extending from the first side extension, and wherein the first side extension and the first clamp extension connect at a first elbow with a first elbow angle, and wherein the first elbow angle is ninety degrees or less.

8. A device comprising:
a longitudinal support portion extending between a first end and a second end;
a first brace connected to the first end of the longitudinal support portion, the first brace comprising a first inside surface, a first outside surface, a first side extension and a first clamp extension, with a first elbow between the first side extension and the first clamp extension, wherein a first elbow angle along the first inside surface is approximately 90 degrees or less, and wherein the first inside surface along the first clamp extension is a first brace clamp surface, wherein the first brace is perpendicularly connected to the longitudinal support portion, wherein the first inside surface along the first side extension is facing the second end of the longitudinal support portion;
a second brace slidably engaged with the longitudinal support portion, the second brace comprising a second inside surface, a second outside surface, a second side extension and a second clamp extension, with a second elbow between the second side extension and the second clamp extension, wherein a second elbow angle along the second inside surface is approximately 90 degrees or less, and wherein the second inside surface along the second clamp extension is a second brace clamp surface, wherein the second inside surface along the second side extension is facing the first end of the longitudinal support portion;
a first threaded rod passing through a first threaded channel in the longitudinal support portion, the first threaded rod comprising a first clamp surface and a first hand-adjuster;
a tool holder base connected to the longitudinal support portion, the tool holder base comprising a tool holder opening for receiving a tool holder;
wherein the first clamp surface is configured to face the first brace clamp surface, and wherein the first hand-adjuster is configured to rotate the first threaded rod and advance the first threaded rod towards the first brace clamp surface.

9. The device of claim 8 further comprising:
a second threaded rod passing through a second threaded channel in the longitudinal support portion, the second threaded rod comprising a second clamp surface, and a second hand-adjuster coupled to the second threaded rod.

10. The device of claim 8 wherein the tool holder opening includes a longitudinal channel inside the tool holder base, and wherein the tool holder base further comprises a first threaded opening through a side of the tool holder base, and which said first threaded opening opens into the longitudinal channel.

11. The device of claim 10 wherein the tool holder base further comprises a threaded tightening rod configured to enter the first threaded opening and pass into the longitudinal channel.

12. A device comprising:
a longitudinal support portion extending between a first end and a second end;
a first brace connected to the first end of the longitudinal support portion, the first brace comprising a first inside surface, a first outside surface, a first side extension and a first clamp extension, with a first elbow between the first side extension and the first clamp extension, wherein a first elbow angle along the first inside surface is approximately 90 degrees or less, and wherein the first inside surface along the first clamp extension is a first brace clamp surface, wherein the first brace is perpendicularly connected to the longitudinal support portion, wherein the first inside surface along the first side extension is facing the second end of the longitudinal support portion;
a second brace slidably engaged with the longitudinal support portion, the second brace comprising a second inside surface, a second outside surface, a second side extension and a second clamp extension, with a second elbow between the second side extension and the second clamp extension, wherein a second elbow angle along the second inside surface is approximately 90 degrees or less, and wherein the second inside surface along the second clamp extension is a second brace clamp surface, wherein the second inside surface along the second side extension is facing the first end of the longitudinal support portion;
a first threaded rod passing through a first threaded channel in the longitudinal support portion, the first threaded rod comprising a first clamp surface and a first hand-adjuster;
a tool holder base connected to the longitudinal support portion, the tool holder base comprising a tool holder opening for receiving a tool holder; a second threaded rod passing through a second threaded channel in the longitudinal support portion, the second threaded rod comprising a second clamp surface, and a second hand-adjuster coupled to the second threaded rod;
wherein the second clamp surface is configured to face the second brace clamp surface.

* * * * *